US006964221B2

(12) United States Patent
Mickelson et al.

(10) Patent No.: US 6,964,221 B2
(45) Date of Patent: Nov. 15, 2005

(54) WELDED HYDRAULIC ACTUATOR INCLUDING A SEAL AND METHOD OF MANUFACTURING SAME

(75) Inventors: Roger D. Mickelson, West Burlington, IA (US); David A. Wiese, Garner, NC (US)

(73) Assignee: CNH America LLC, New Holland, PA (US)

( * ) Notice: Subject to any disclaimer, the term of this patent is extended or adjusted under 35 U.S.C. 154(b) by 33 days.

(21) Appl. No.: 10/758,063

(22) Filed: Jan. 15, 2004

(65) Prior Publication Data
US 2004/0143953 A1   Jul. 29, 2004

Related U.S. Application Data

(63) Continuation-in-part of application No. 10/037,405, filed on Dec. 21, 2001, now Pat. No. 6,694,615.

(51) Int. Cl.$^7$ .............................................. F01B 29/00
(52) U.S. Cl. ......................................... 92/128; 92/164
(58) Field of Search .......................... 92/128, 123, 164, 92/169.1, 171.1, 240, 246

(56) References Cited

U.S. PATENT DOCUMENTS

| | | | | |
|---|---|---|---|---|
| 2,426,108 A | * | 8/1947 | Loewe | ......................... 92/164 |
| 2,487,512 A | | 11/1949 | Berger | |
| 2,687,910 A | * | 8/1954 | Petch et al. | .................... 92/164 |
| 2,865,693 A | * | 12/1958 | Barnhart | ..................... 92/169.1 |
| 3,650,182 A | * | 3/1972 | Phillips | ........................ 92/164 |
| 4,037,305 A | | 7/1977 | Larsson | |
| 4,190,479 A | | 2/1980 | Smith | |
| 4,211,150 A | * | 7/1980 | Framberg | ..................... 92/164 |
| 4,706,364 A | | 11/1987 | Aubry | |
| 4,901,424 A | | 2/1990 | Menendez | |
| 4,930,204 A | | 6/1990 | Schurter | |
| 5,014,601 A | | 5/1991 | Sundholm | |
| 5,358,168 A | | 10/1994 | Williamson | |
| 6,439,103 B1 | | 8/2002 | Miller | |
| 6,637,315 B2 | | 10/2003 | Mickelson | |
| 2003/0116012 A1 | | 6/2003 | Mickelson | |

\* cited by examiner

Primary Examiner—Thomas E. Lazo
(74) Attorney, Agent, or Firm—John William Stader

(57) ABSTRACT

A hydraulic actuator for use in a work vehicle includes a tube including a first end, a second end and an inner surface; a plug with a portion of the plug disposed inside the tube and a portion of the plug extending outside the tube; a weld extending around the perimeter of the plug and coupling the first end of the tube to the plug, the weld forming a fluid-tight seal between the plug and the tube; a seal abutting against the plug and the inner surface of the tube and being spaced from the weld; an end plug affixed to the second end of the tube to enclose and seal the second end of the tube, the end plug defining a rod opening; a piston configured to be slidingly supported within the tube, the piston including a retract face, an extend face oppositely disposed from the retract face and a lip protruding from the extend face; and a piston rod affixed to the piston, the piston rod extending out of the tube through the rod opening.

12 Claims, 5 Drawing Sheets

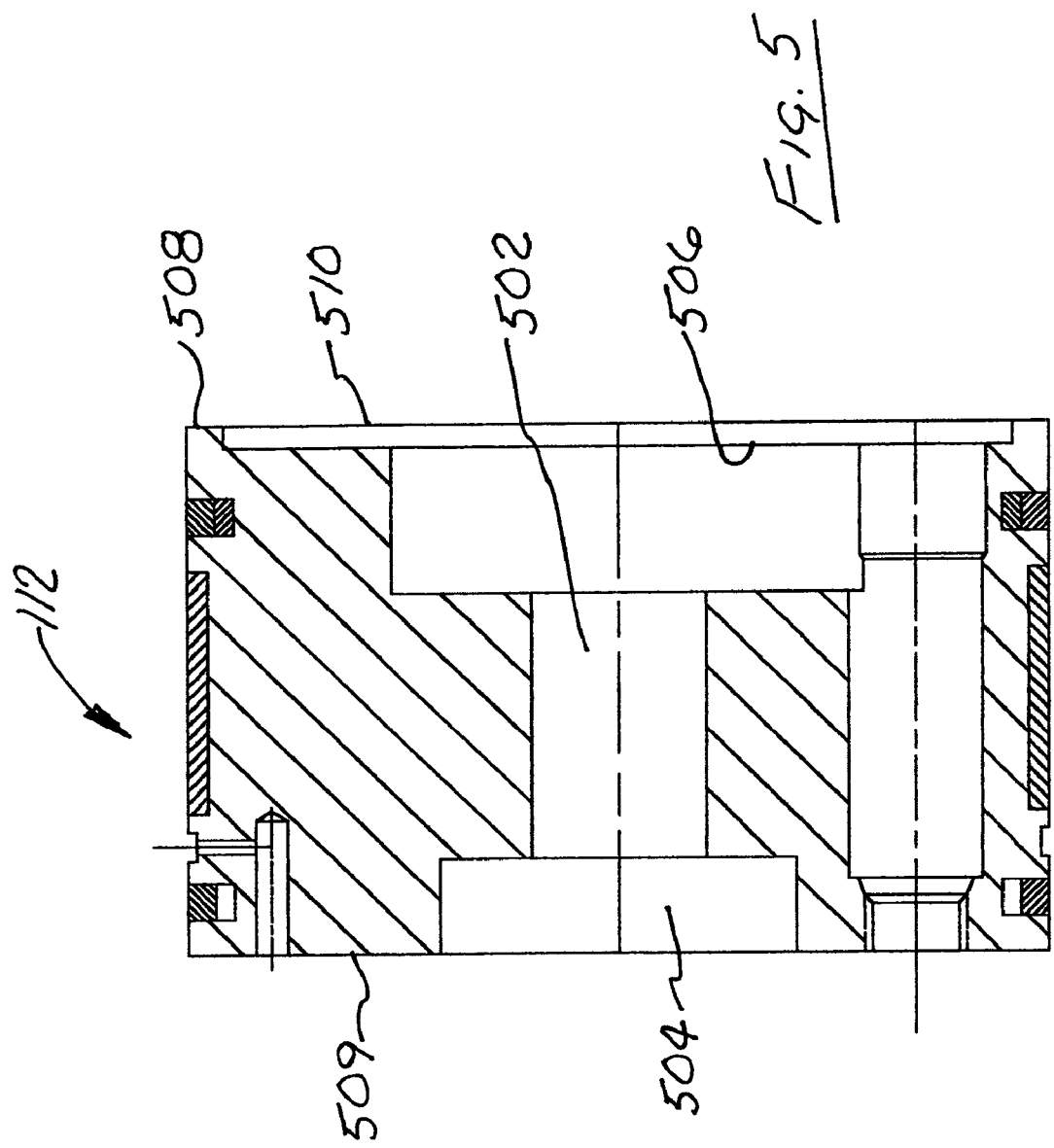

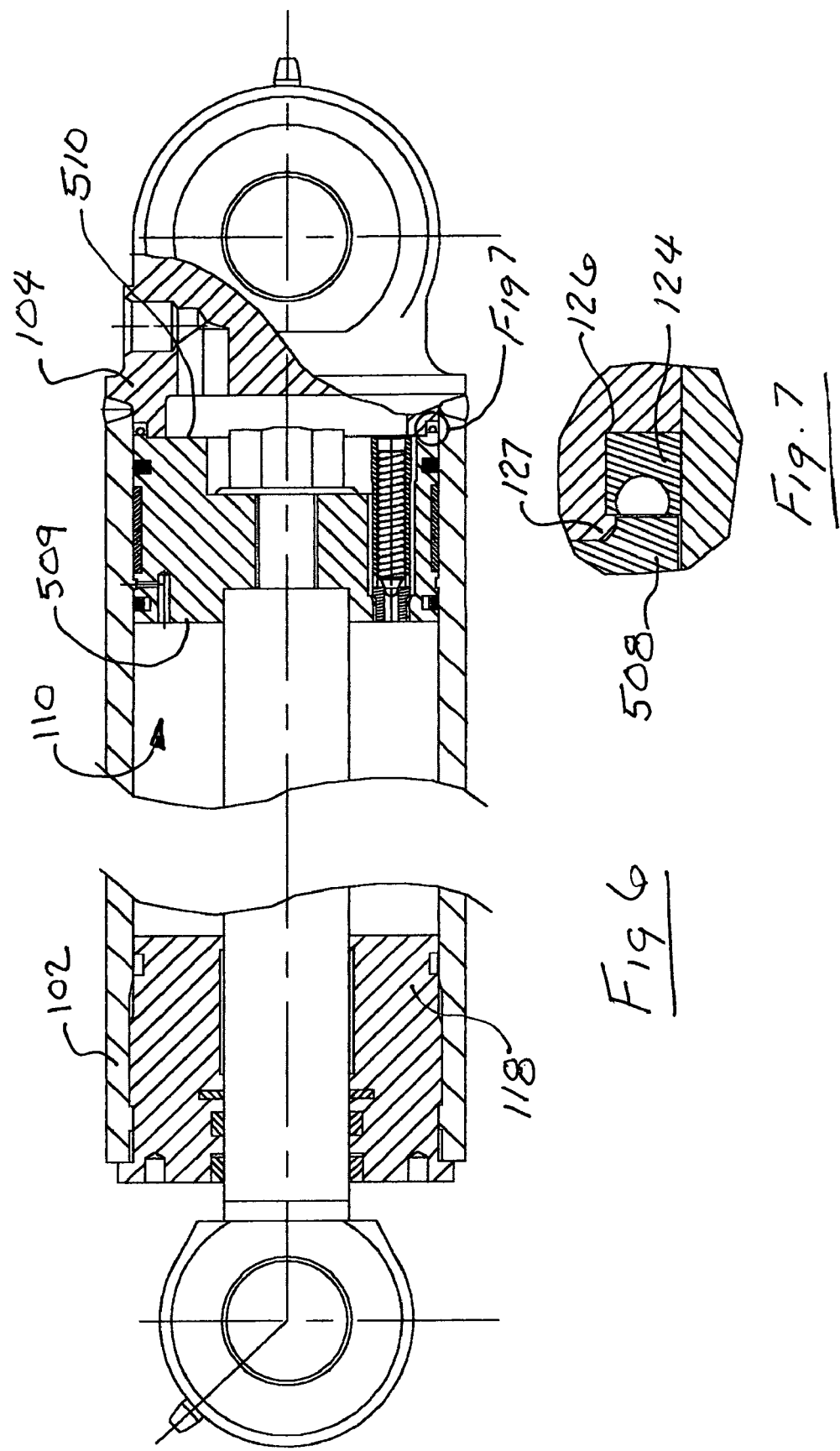

WELDED HYDRAULIC ACTUATOR INCLUDING A SEAL AND METHOD OF MANUFACTURING SAME

CROSS REFERENCE TO RELATED APPLICATIONS

This application is a continuation-in-part of U.S. patent application Ser. No. 10/037,405, filed Dec. 21, 2001, now U.S. Pat. No. 6,694,615.

FIELD OF THE INVENTION

The invention relates generally to hydraulic actuators. More particularly, it relates to welded hydraulic actuators formed of a tubular portion and an end cap or plug that is welded to the actuator to enclose one end of the actuator.

BACKGROUND OF THE INVENTION

Hydraulic actuators are used in a wide variety of industrial applications. One of the more common uses is as actuators on work vehicles. Work vehicles, such as agricultural tractors, road graders, telehandlers, skid steer loaders, and mobile drilling rigs, use either single- or double-acting hydraulic actuators to move various components of the work vehicle and to move implements attached to the work vehicle with respect to the vehicle and with respect to each other.

A common method of manufacturing these actuators is to machine and polish the inside of a tube, such as a cylindrical tube. A plug or end cap is machined to enclose one end of the tube through which fluid will be introduced or removed from the actuator. The plug is partially inserted into the cylindrical tube, clamped in a rotational welding machine, and rotated in that machine while a circumferential weld is made that bonds one end of the tube to a portion of the plug.

To ensure that the plug and the cylindrical tube are properly aligned during the welding process, the plug is usually provided with a pilot portion on one end that is inserted into the tube. This pilot portion has a smaller diameter than the remainder of the plug portion and the junction between the pilot portion and the remainder is formed as a planar or conical shoulder. To assemble the tube and plug, the pilot portion is inserted into the tube until the shoulder on the plug abuts an end face of the tube. The weld is formed between the end face of the tube and the abutting shoulder portion of the plug.

A common failure mode for such welded actuators is that of weld failure. Hydraulic pressure acting against the inside surface of the tube creates hoop stress, which tends to cause the tube to expand or increase in diameter. The plug, on the other hand, is typically made of a rigid, solid piece of steel that does not expand when hydraulic fluid presses against its internal surfaces. As a result, a bending stress is created right at the weld joint coupling the tube and the plug. The tube expands radially when pressure is applied. The plug does not expand. Since the junction between the tube and the plug is the circumferential weld joint, it is the circumferential weld joint where the stress is at a maximum.

One way of avoiding failures at the tube-to-plug joint has been to provide a more flexible coupling. For example, rather than employing a weld to join the tube and plug, many actuators, especially smaller actuators, use a thread joint between the tube and plug. In these actuators, a pilot portion of the outside diameter of the plug is threaded, and a corresponding inside portion of the end of the tube is also threaded. To couple the two together, the threads on the outside of the plug are engaged with the threads on the inside of the tube and the two are threaded together. When hydraulic fluid under pressure is introduced into the actuator, the tube expands slightly due to the hoop stress generated by the fluid. Since the bond between the tube and the plug is a thread joint, the tube is free to expand slightly thereby slightly increasing the gap between the tube and the plug. This non-restrictive joint allows slight expansion of the tube to occur without additional stresses of a joint trying to restrain it. In this manner, the tube is made stronger. In addition, by eliminating the weld joint, the "cast" portion of the actuator, the actuator is made much more resistant to stress generally.

Of course, since the tube is permitted to expand with respect to the plug, a gap between the two along the thread joint is created. This gap, although small, provides a fluid leakage path. Fluid inside the actuator will leak out of the actuator along this thread joint. For this reason, a fluid tight seal that is relatively flexible is placed between the plug and the tube. In smaller actuators, this may be nothing more than a wrapping of thin Teflon® tape around the external threads on the plug. For larger actuators, however, such as those that have an area greater than about ½" in diameter, seal, such as an O-ring, is typically placed in a circumferential or otherwise peripheral groove in the plug before it is inserted into the tube. The O-ring extends circumferentially around the diameter or perimeter of the plug and abuts both the plug and the tube providing a generally fluid-tight seal between the two that prevents fluid in the actuator from leaking out between the threads on the plug and the mating threads on the tube. When the tube in these threaded cap arrangements are pressurized with hydraulic fluid, it expands. The O-ring, however, is selected to be sufficiently pre-loaded to maintain contact with the internal walls of the tube even when it expands slightly because of hoop stress.

Nevertheless, a problem with threaded actuators is that forming the threads is an expensive operation relative to welding. Roger Mickelson recognized a need in the art for a welded actuator that reduced bending stress, and disclosed an improved hydraulic actuator that provides the low cost and ease of manufacture of a welded actuator yet reduces the longitudinal tensile forces on the weld to increase the actuator's longevity in U.S. Pat. No. 6,637,315, issued Oct. 28, 2003, and U.S. patent application Ser. No. 10/037,405, filed Dec. 21, 2001. U.S. Pat. No. 6,637,315 and U.S. patent application Ser. No. 10/037,405 are incorporated herein by reference.

A problem presented by inserting a seal into an actuator having a welded plug is that the seal cannot be placed into the tube along with the plug, as in an actuator having a threaded connection between the plug and the tube. Rather, to prevent damage to the seal during the welding operation, the seal must be inserted after the plug is welded to the tube. Therefore, even with the advances in the art represented by U.S. Pat. No. 6,637,315 and U.S. patent application Ser. No. 10/037,405, there is a need for an apparatus and method that make assembly of the hydraulic actuator having a welded tube and plug simpler and therefore less costly.

SUMMARY OF THE INVENTION

According to one aspect of the invention, a hydraulic actuator for use in a work vehicle comprises a tube including a first end, a second end and an inner surface; a plug with a portion of the plug disposed inside the tube and a portion of the plug extending outside the tube; a weld extending around the perimeter of the plug and coupling the first end of the tube to the plug, the weld forming a fluid-tight seal between the plug and the tube; a seal abutting against the plug and the inner surface of the tube and being spaced from the weld; an end plug affixed to the second end of the tube to enclose and seal the second end of the tube, the end plug defining a rod opening; a piston configured to be slidingly supported within the tube, the piston including a retract face, an extend face oppositely disposed from the retract face and a lip protruding from the extend face; and a piston rod affixed to the piston, the piston rod extending out of the tube through the rod opening.

According to another aspect of the invention, a method of manufacturing a hydraulic actuator for a work vehicle, in which the actuator includes a tube and a plug, comprises the steps of inserting a portion of the plug into a first end of the tube; forming a weld between the plug and the first end of the tube around the entire perimeter of the plug and tube to form a hydraulic-fluid-tight junction between the plug and tube; inserting a seal into a second end of the tube such that the seal is coaxial with the plug; inserting a piston assembly into the tube; coupling a second plug to a second end of the tube, the second end being oppositely disposed to the first end; and supplying hydraulic fluid to retract the piston assembly into the tube and to force the seal into an abutting relationship with the plug.

According to yet another aspect of the invention, a method of manufacturing a hydraulic actuator for a work vehicle, in which the actuator includes a tube and a plug, comprises the steps of: inserting a portion of the plug into a first end of the tube; forming a weld between the plug and the first end of the tube around the entire perimeter of the plug and tube to form a hydraulic-fluid-tight junction between the plug and tube; inserting a seal into a second end of the tube such that the seal is coaxial with the plug; inserting a piston assembly into the tube; and forcing the piston assembly into the tube to seat the seal.

BRIEF DESCRIPTION OF THE DRAWINGS

The present invention will become more fully understood from the following detailed description, taken in conjunction with the accompanying drawings, wherein like reference numerals refer to like parts, in which:

FIG. 5 is a cross-sectional view of a piston having a lip formed on one end according to another embodiment of the invention;

FIG. 6 is a cross-sectional view of a hydraulic cylinder according to the embodiment shown in FIG. 5; and FIG. 7 is a detail view of a seal disposed in a groove of an end cap according to the embodiment shown in FIGS. 5 and 6.

DESCRIPTION OF THE PREFERRED EMBODIMENTS

Figure 1:
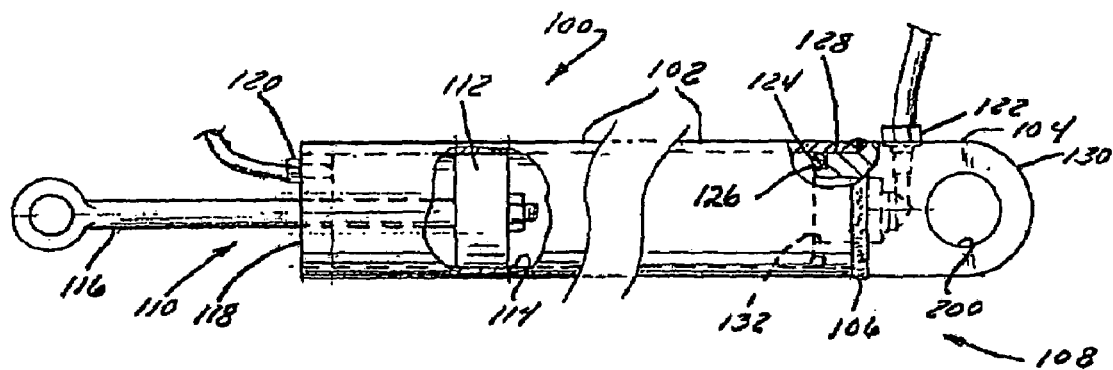
FIG. 1 is a partial cut away view of a hydraulic cylinder in accordance with the present invention.

Referring now to FIG. 1, a hydraulic actuator, and in particular a hydraulic cylinder 100, is shown comprising a tubular portion 102 welded to a plug 104 at weld joint 106. Since the tube and plug are joined together by weld joint 106, they form an integral tube and plug assembly 108. A piston assembly 110 includes a piston 112, which is disposed inside of and sealingly engages with inner cylindrical wall 114, and piston rod 116, which is fixed to piston 112. Piston 112 and inner wall 114 are so dimensioned as to permit piston 112 to slide within tube portion 102 while maintaining a hydraulic-fluid-tight seal between the outer surface of piston 112 and inner wall 114. A second plug 118 is threadedly engaged with the distal end of tube portion 102 located away from plug 104. Threads formed on the outer surface of second or threaded plug 118 engage mating threads formed on the inner surface of tube portion 102 at the distal end of tube portion 102.

In the preferred embodiments, the hydraulic actuator is a hydraulic cylinder comprising a cylindrical tubular portion 102, a piston 112 having a circular cross section, and other components having circular cross sections. However, it will be appreciated that other cross sections will work equally well, and that the invention is not limited to any particular cross-sectional shape. Thus, the tubular portion may have a rectangular, elliptical or triangular cross section, as may the other components.

Hydraulic cylinder 100 is a double-acting cylinder having two ports 120 and 122 located at opposing ends of tube portion 102. Port 120 may be formed in second plug 118 to permit hydraulic fluid to flow into and out of the cylinder. Alternatively, it may be formed in the tube itself at a location generally adjacent to plug 118. Port 122 may be formed in plug 104 to permit fluid to flow into and out of the cylinder. An O-ring 124 or other seal (but preferably an O-ring) is disposed in a circumferential or peripheral groove 126 in the outer circumferential surface 128 of plug 104. O-ring 124 preferably has a radial thickness of between 0.020 and 0.250 inches. More preferably it has a radial thickness of between 0.040 and 0.180 inches. Even more preferably it has a radial thickness of between 0.060 and 0.150 inches.

Plug 104 is configured as two integrally formed portions: an eye portion 130 that extends outward away from weld joint 106 and a pilot portion 132 that extends inward into tube portion 102 from weld joint 106. Outer circumferential surface 128 and circumferential groove 126 are formed in the pilot portion 132 of plug 104.

Figure 2:
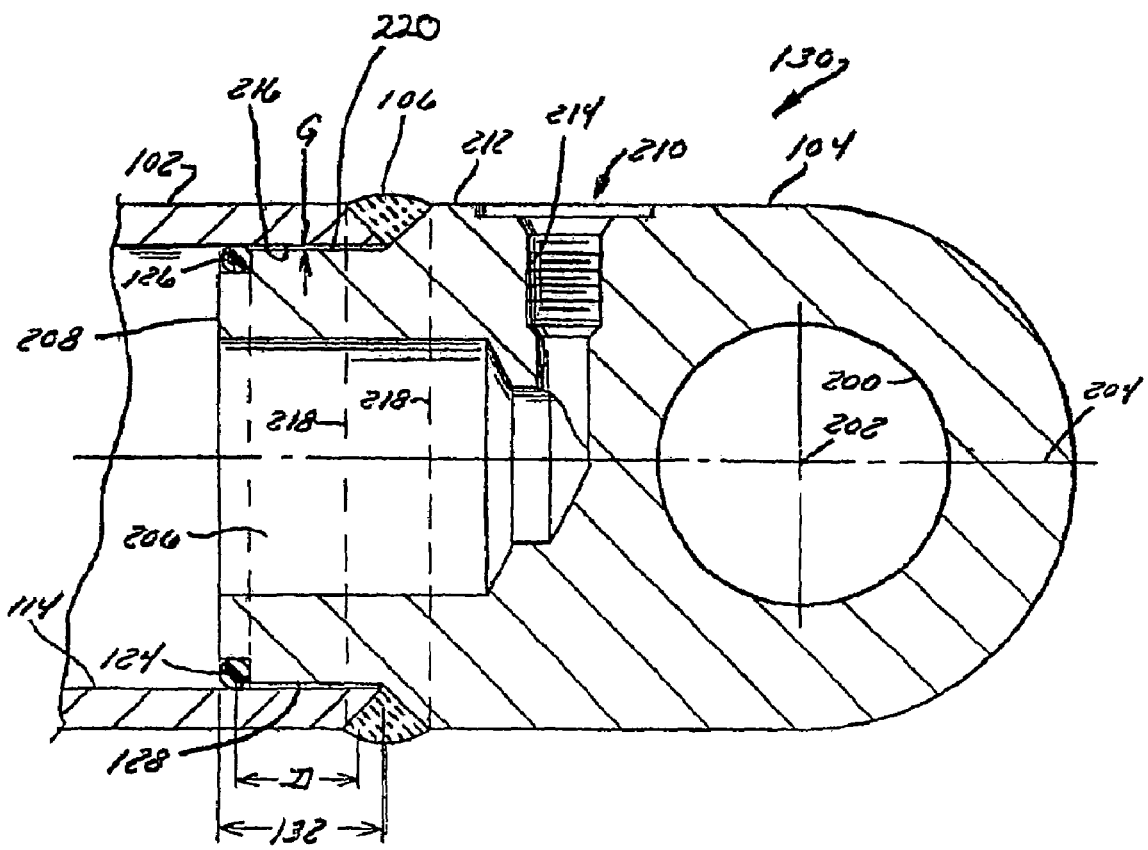
FIG. 2 is a cross-sectional view of the plug of FIG. 1 taken along the longitudinal axis of both the tube and the plug.

Referring now to FIGS. 2 and 7, plug 104 and the end of tube portion 102 are shown in greater detail. As shown by cross-hatching, plug 104 is an integral body. It has an eye 200 formed in eye portion 130 with a longitudinal axis 202 that is perpendicular to and intersects longitudinal axis 204 of plug 104 itself. A counter bore 206 is formed in pilot portion 132 extending from free inner surface 208, through pilot portion 132 and into eye portion 130. Counter bore 206 is preferably coaxial with plug 104 sharing the same longitudinal axis 204. An intersecting bore 210 is formed in eye portion 130 extending between outer circumferential surface 212 of eye portion 130 into counter bore 206 which it intersects. An inner surface of bore 210 has internal threads 214 configured to engage hydraulic line or coupling. Intersecting bore 210 defines port 122 previously identified in FIG. 1. As shown in FIG. 7 and discussed in more detail below, plug 104 has a groove 126 formed around the perimeter of the end of pilot portion 132. The groove 126 is formed such that a lip or overhang 127 extends radially outward from the end of pilot portion 132.

Outer circumferential surface 128 of pilot portion 132 is spaced away from the inner circumferential surface 216 of tube portion 102. In this manner, a gap "G" is provided between the two surfaces 216 and 128. This gap, on the order of 0.001 to 0.020 inches, depending upon the tolerance stackups of the cylinder, is small enough to hold plug 104 and tube portion 102 in close alignment to permit accurate welding (indicated by weld joint 106), yet is large enough to permit plug 104 to be inserted into tube 102 without undue force. Such force, if the gap is too small, could cause plug 104 to jam when it is inserted into the open end of tube 102 prior to welding. O-ring 124, weld joint 106, inner surface 216, and outer surface 128 define a sealed cylindrical cavity 220.

O-ring 124 is disposed in circumferential groove 126 and is sized such that it seals against groove 126 and also against the inner circumferential surface 216 of tube portion 102. The O-ring is not provided to prevent leakage out of the cylinder, however, since weld joint 106 prevents fluid leakage. Weld joint 106, as shown by dashed lines 218 extends circumferentially around the entire outer surface of tube 102 and plug 104, thereby providing an integral metal seal between tube 102 and plug 104. Weld joint 106 is comprised of metal from tube 102, metal from plug 104, and additional metal deposited during the welding process. Its microstructure is cast, and is not work-hardened. O-ring 124 is not positioned directly adjacent to weld joint 106, but is spaced away from weld joint 106 by a distance "D". Distance "D" is preferably between about 1 and about 0.1 inches. More preferably it is between about 0.5 and about 0.2 inches. Most preferably it is between about 0.4 and about 0.25 inches. Experiments conducted on welded cylinders using an O-ring such as that shown in FIGS. 1 and 2 illustrate the unusual and unanticipated results of applying an O-ring to a pilot portion of a welded cylinder.

Figure 3A:
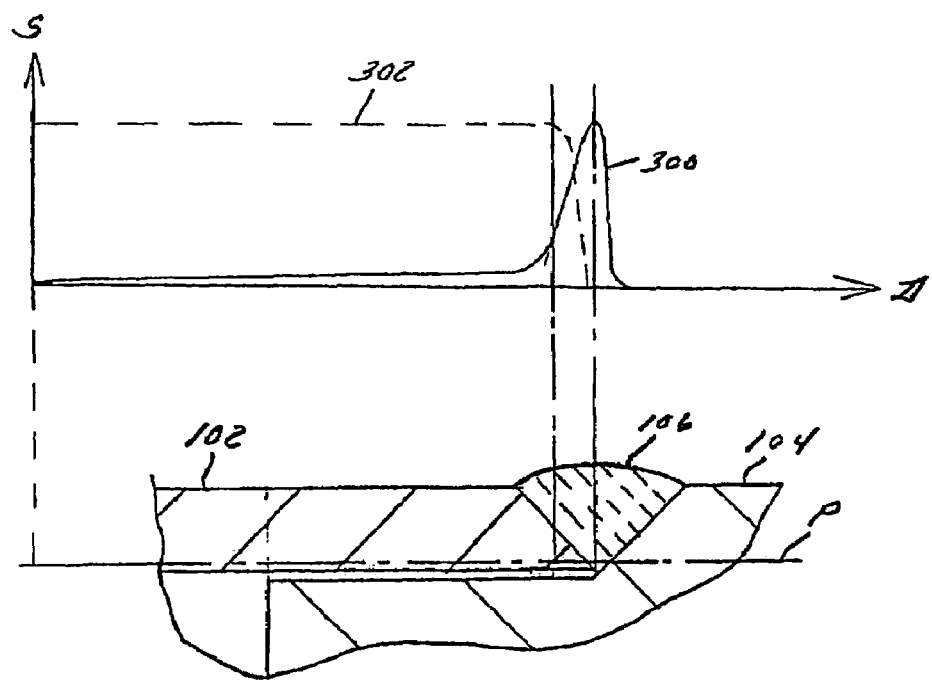
FIGS. 3A and 3B are charts and partial sectional views of a cylinder lacking the seal between the tube and the plug, and a cylinder having the seal disposed between the tube and the plug showing the longitudinal tensile and hoop stresses generated within the cylinder along a path "P" that extends along the inner surface of the tube and through the plug of these cylinders at the same depth.

FIG. 3A illustrates a pair of exemplary hoop stress and longitudinal tensile stress curves for a prior art welded cylinder. In FIG. 3A, the solid curve 300 represents longitudinal tensile stress in the tube at its inner surface 216. Dashed curve 302 represents the hoop stress within the cylinder caused by hydraulic fluid pressure. Note that the longitudinal tensile stress in tube portion 102 is quite low away from plug 104. As one travels along tube portion 102 towards plug 104, the longitudinal tensile stress begins to increase, indicating how weld joint 106 constrains the expansion of tube 102 when hydraulic fluid is applied inside cylinder 100. The longitudinal tensile stress reaches a maximum in the vicinity of weld joint 106. It rapidly falls off as we traverse path "P" into plug 104. In a similar fashion, the hoop stress indicated by curve 302 is at a maximum in tube 102 and drops to near zero in weld joint 106. Thus, the longitudinal tensile stress in cylinder 100 reaches a maximum at weld joint 106. This high longitudinal tensile stress produces weld joint failure. Its effects are amplified by the fact that it is applied right at the root of a "crack"—the joint between the tube and the plug where the weld is formed. This region, while not formed by cracking but by welding, is a stress concentrator due to its very small radius of curvature right where the weld is formed.

Figure 3B:
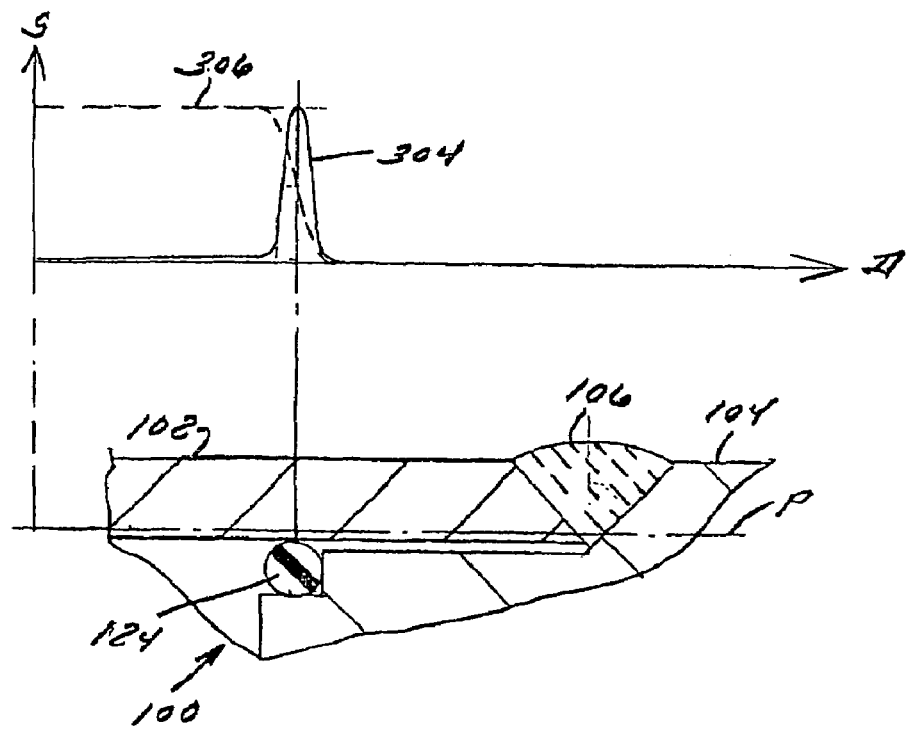

FIG. 3B illustrates the changes in cylinder stress provided by the use of O-ring 124. As in the previous example shown in FIG. 3A, hoop stress 306 reaches a maximum in a portion of tube 102 located away from plug 104. As one traverses path "P" through cylinder 100, from left to right, the hoop stress drops dramatically, approaching zero, in the vicinity of O-ring 124. At the same time, the longitudinal tensile stress indicated by curve 304 is at a minimum in tube 102 located away from plug 104 and increases to a maximum in the vicinity of O-ring 124. Longitudinal tensile stress 304 decays to near zero moving along path "P" rightwardly from O-ring 124 to weld joint 106. Thus, longitudinal tensile stress is at its maximum in the vicinity of O-ring 124 and is significantly reduced at weld joint 106, as compared to the longitudinal tensile stress that would exist in the absence of O-ring 124.

This reduction of stress, or rather the transfer of stress from weld joint 106 to the vicinity of O-ring 124 is unexpected and anomalous. While O-rings have been provided in the past in cylinder plug grooves having threaded joints (rather than welded joints), their function has been to prevent leakage of fluid through a thread joint between the cylinder tube and the cylinder plug. They have not been used, nor is there any reason to use them, in hydraulic cylinders using a welded tube/plug joint, since the weld joint itself provides both mechanical connection and the leak proof seal.

Figure 4:
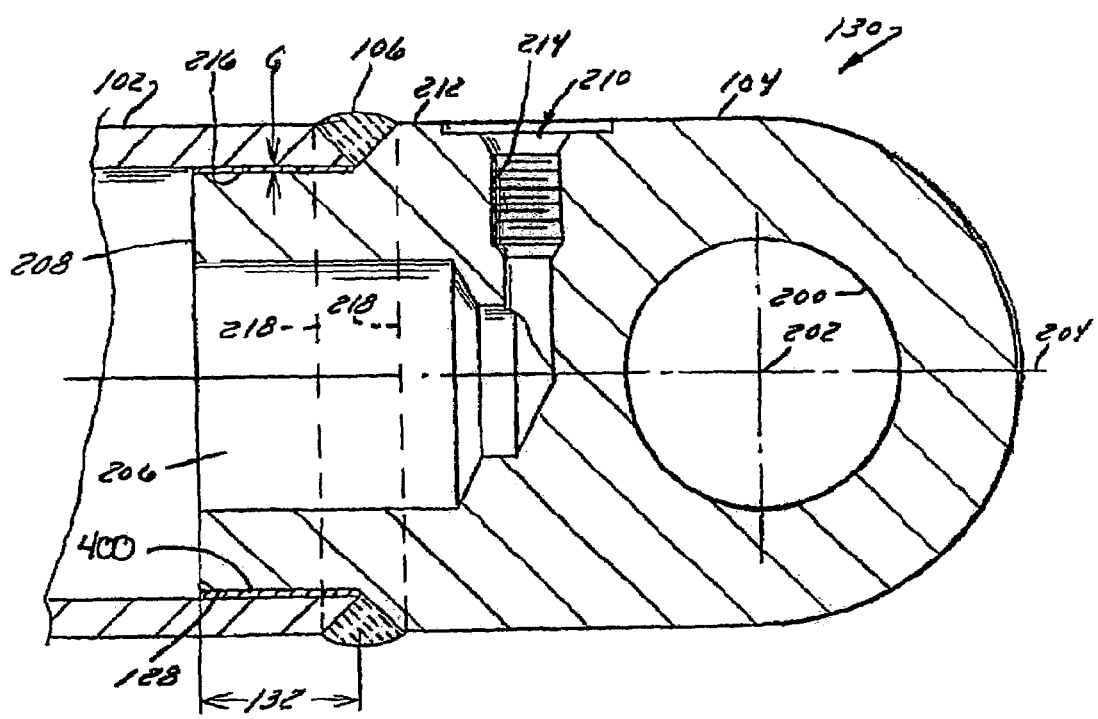
FIG. 4 is an alternative embodiment of the cylinder of FIGS. 1–2 in which the O-ring seal illustrated in those FIGURES is replaced with a polymeric adhesive seal.

FIG. 4 illustrates an alternative embodiment of the cylinder of FIGS. 1 and 2 in which a different seal 400 is provided between tube portion 102 and plug 104 in pilot portion 132. The embodiments shown in FIGS. 2 and 4 differ in one respect. In FIG. 4, circumferential groove 126 has been eliminated, together with O-ring 124, and is replaced with seal 400, which is preferably a polymeric sealant, that is disposed in gap "G" between inner circumferential surface 216 of tube portion 102 and outer circumferential surface 128 of pilot portion 132. The preferred polymeric sealant is an anaerobic adhesive, which is preferably of a low viscosity sufficient to permit it to penetrate gap "G" by capillary action. Suitable sealants include "Thread Locker 290®," "Loctite® 603," or "Loctite® 609." Each of these products are manufactured by Loctite Corporation.

To ensure a good bond, cleaning of the surfaces of the gap is preferred. The material for cleaning the surfaces is preferably 1,1,1-trichlorethane or any of the alternatives or equivalents for the solvent that are currently used. Such hydrocarbon-based solvents are preferred since they dry residue free, thus providing a good seal between the surfaces 216 and 128. A primer or surface activator such as "Primer 7471®," (Loctite Corporation) may be used after cleaning to enhance the quality of the bond where the metals that form tube 102 and plug 104 are passive. Primer 7471® is also beneficial when the gap "G" between the tube and plug is greater than about 0.004 of an inch.

Although the hydraulic cylinder according to the foregoing embodiments endured more cycles than known hydraulic cylinders, the foregoing hydraulic cylinder presented the difficulty of inserting an O-ring or other seal down the length of the tube portion until the seal seated in the groove in the plug. The seal preferably fits snugly within the tube portion, so the seal is difficult, if not impossible, to force down the tube portion by hand. In addition, the tube portion in many hydraulic actuators according to the foregoing embodiments is long—often longer than the average human arm—so even if one could force the seal down the tube portion, one could not reach far enough to seat the seal. Even if one could reach the end of the tube portion, one would encounter difficulty getting the O-ring to seat in its final position. Accordingly, there is a need for a welded hydraulic cylinder including a seal having the benefits of the foregoing embodiments, but being simple to manufacture.

Another embodiment according to the invention achieves an improvement in the foregoing embodiments in that it is simpler to insert the seal in the welded tube portion. This embodiment is shown in FIGS. 5, 6 and 7.

FIG. 5 shows piston 112, which preferably includes a stud bore 502 having a piston rod bore 504 on one end and a nut bore 506 on the other end. Rod bore 504 is formed into a retract face 509 of piston 112 and nut bore 506 is formed into extend face 510. Stud bore 502 receives a threaded stud of piston rod 116 (shown in FIG. 1), piston rod bore 504 receives piston rod 116 itself, and nut bore 506 receives a nut that screws onto stud bore 502 to hold piston rod 116 to piston 112. The assembled piston rod and piston form piston assembly 110 as shown in FIGS. 1 and 6. Of course, the way of connecting the piston to the rod is not essential to the invention, and other piston assemblies may be used.

As shown in FIG. 5, retract face 509 of piston 112 is the face on which pressurized hydraulic fluid is applied to force the piston assembly further into the tube portion 102 until piston assembly 110 is fully retracted, which occurs when extend face 510 of piston 112 contacts plug 104. Conversely, hydraulic fluid is applied to extend face 510 to force the piston assembly out of tube portion 102 until piston assembly 110 is fully extended, which occurs when retract face 509 of piston 112 contacts second plug 118. As shown in FIGS. 1 and 6, the retract and extend faces are disposed oppositely to each other and are spaced along the tube longitudinal axis.

Also as shown in FIG. 5, piston 112 preferably includes a lip 508 protruding from extend face 510 of piston 112. Lip 508 is preferably integrally formed with the main body of piston 112, and can be formed by milling or grinding away a portion of extend face 510. However, the lip need not be integrally formed, and may be attached to the piston in an operation subsequent to forming the main body of the piston, such as by welding or adhering. The lip may also be formed of a material different from the main body of the piston, including, but not limited to, other metals, plastic or rubber. The lip allows O-ring or other seal 124 (shown in FIGS. 6 and 7) to be pressed into groove 126 formed in plug 104 during assembly of the hydraulic actuator. Therefore, the lip is preferably the same or substantially the same diameter or size as O-ring 124. Of course, a seal other than an O-ring may be used, such as a gasket, without departing from the scope of the invention.

As shown in FIG. 7, lip 508 of the piston is preferably shaped to interfit with groove 126 of the plug. When the piston is in the fully retracted position, as shown in FIG. 7, O-ring 124 is disposed within the groove 126 and interposed between the lip 508 and the surfaces of groove 126. O-ring 124 is held in place by overhang 127.

To assemble the hydraulic actuator according to this embodiment, the piston assembly is assembled, and, separately, the tube and plug assembly is assembled. Thus, the tube and plug assembly is assembled so that, but for the absence of the piston assembly and second plug, the tube portion is ready to receive hydraulic fluid.

Next, the O-ring is placed into the tube portion and forced along the length of the tube toward the plug a distance that is less than the entire working length of the tube portion. (The working length, or stroke, is the length between the threaded plug and the welded plug.) The piston assembly is then inserted into the tube portion and the threaded plug is attached to the tube portion, such as by screwing the threaded plug into the tube portion. Of course, the threaded or second plug may be welded or adhered, rather than screwed onto, the tube portion.

At this point, the hydraulic actuator is ready to receive hydraulic fluid. However, the O-ring is not yet seated in the groove 126 of the plug. To seat the O-ring as shown in FIG. 7, hydraulic fluid is added under pressure to the side of the tube portion bounded by the retract face, thus forcing the piston assembly into the tube portion. Alternatively, rather than forcing the piston assembly with hydraulic pressure, a mechanical device can be used.

As the piston is forced along the interior of the tube portion by the hydraulic fluid or mechanical device, the lip 508 of the piston eventually comes in contact with O-ring 124 and forces O-ring 124 into groove 126. Preferably groove 126 is formed with a rim or overhang 127, which retains the O-ring in groove 126. Once the O-ring is seated in the groove, it remains seated regardless of whether the piston assembly is retracted into or extended out of the tube portion.

It will be appreciated by one of ordinary skill in the art that the method can be used in any hydraulic actuator having a welded plug and a seal. Thus, it is not necessary to use the method with hydraulic actuators that include a piston having a lip and an end plug having a groove. We believe that either or both of the lip and groove can be omitted and the method of inserting the seal using the piston assembly to seat the seal will still be effective.

It is surprising that the provision of an O-ring or sealant adjacent to a welded joint would reduce weld failures. First, cavity 220 that is being sealed is about 0.001 to 0.020 inches in thickness in some applications (i.e. the gap between the inner wall of the tube and the outer surface of the pilot portion) with a length of about 0.25 to about 0.75 inches (the longitudinal distance between the weld and the O-ring) and a circumference of about 8 to about 16 inches (for a cylinder inner diameter of about 2.5 to about 5 inches). The volume that is sealed between the weld and the O-ring might vary in a typical rage of applications between about 0.002 cubic inches and about 0.25 cubic inches. This range of volumes is so small compared with the length of the O-ring (8 to 16 inches) that the O-ring would seem to provide little resistance to tiny quantities of fluid passing the O-ring to fill the sealed-off volume. Once the sealed-off volume was filled with fluid, one might expect that the O-ring would no longer reduce stress near the weld, since any pressure in the cylinder would immediately be communicated through the O-ring to the sealed-off volume. Surprisingly, this does not happen even after repeated pressure cycling of the fluid in the cylinder. The hoop stress in the tube adjacent the sealed-off portion stays low and thus the bending stress applied to the weld joint is minimized.

We are not sure of the mechanism that reduces stress in the tube between the O-ring and the weld that provides the benefits of the present invention. We believe it may be due to residual air trapped between the O-ring and the weld in the sealed-off volume. If air remains trapped in the sealed-off volume even after repeated pressure cycling, slight compression of the O-ring when the cylinder is pressurized will not raise the pressure in the sealed-off volume significantly. This mechanism would reduce hoop stress in the tube and reducing bending stress at the weld.

We do not intend for the claims to be limited to this possible mechanism of operation. It is provided only as a possibility.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A hydraulic actuator for use in a work vehicle, comprising:
   a tube including a first end, a second end and an inner surface;
   a plug, wherein a portion of the plug is disposed inside the tube and a portion of the plug extends outside the tube, the plug including a pilot portion having an outer surface spaced from the inner surface of the tube such that a cavity is formed between the outer surface of the plug;
   a weld extending around the perimeter of the plug and coupling the first end of the tube to the plug, the weld forming a fluid-tight seal between the plug and the tube;
   a seal abutting against the plug and the inner surface of the tube and being spaced from the weld, the weld and the inner surface of the tube, and the cavity sealed by the seal;
   an end plug affixed to the second end of the tube to enclose and seal the second end of the tube, the end plug defining a rod opening;
   a piston configured to be slidingly supported within the tube, the piston including a retract face, an extend face oppositely disposed to the retract face and a lip protruding from the extend face; and
   a piston rod affixed to the piston, the piston rod extending out of the tube through the rod opening.

2. A hydraulic actuator according to claim 1, wherein the seal is an O-ring having a diameter and the piston has a diameter, and the diameters of the O-ring and the piston are substantially the same.

3. A hydraulic actuator according to claim 1, wherein the plug includes a groove in the portion of the plug disposed within the tube, and the seal is disposed within the groove.

4. A hydraulic actuator according to claim 3, wherein the lip of the piston is configured to press the seal into the groove of the plug.

5. A hydraulic actuator according to claim 3, wherein the lip of the piston is adapted to interfit with the groove of the plug.

6. A method of manufacturing a hydraulic actuator for a work vehicle, the actuator including a tube and a plug, the method comprising the steps of:
   inserting a portion of the plug into a first end of the tube;
   forming a weld between the plug and the first end of the tube around the entire perimeter of the plug and tube to form a hydraulic-fluid-tight junction between the plug and tube;
   inserting a seal into a second end of the tube such that the seal is coaxial with the plug;
   inserting a piston assembly into the tube;
   coupling a second plug to a second end of the tube, the second end being oppositely disposed to the first end; and
   supplying hydraulic fluid to retract the piston assembly into the tube and to force the seal into an abutting relationship with the plug.

7. The method of claim 6, wherein the plug includes a peripheral groove in the portion of the plug disposed within the tube and the step of supplying hydraulic fluid forces the seal into the peripheral groove.

8. The method of claim 6, wherein the piston assembly includes a piston including a retract face, an oppositely disposed extend face, and a lip protruding from the extend face, and the step of supplying hydraulic fluid supplies fluid to impinge the retract face to force the lip of the piston into abutment with the seal.

9. The method of claim 7, wherein the piston assembly includes a piston including a refract face, an oppositely disposed extend face, and a lip protruding from the extend face, and the step of supplying hydraulic fluid supplies fluid to impinge the retract face to move the lip of the piston to interfit with the groove.

10. A method of manufacturing a hydraulic actuator for a work vehicle, the actuator including a tube and a plug, the method comprising the steps of:
    inserting a portion of the plug into a first end of the tube;
    forming a weld between the plug and the first end of the tube around the entire perimeter of the plug and tube to form a hydraulic-fluid-tight junction between the plug and tube;
    inserting a seal into a second end of the tube such that the seal is coaxial with the plug;
    inserting a piston assembly into the tube; and
    forcing the piston assembly into the tube to seat the seal.

11. The method of claim 10, further comprising coupling a second plug to a second end of the tube, the second end being oppositely disposed to the first end, wherein the step of forcing the piston assembly includes supplying hydraulic fluid to retract the piston assembly into the tube and to seat the seal includes placing the seal into an abutting relationship with the plug.

12. The method of claim 10, wherein the step of forcing the piston assembly into the tube includes a mechanical device to seat the seal includes placing the seal into an abutting relationship with the plug.

* * * * *